No. 842,938.  
PATENTED JAN. 29, 1907.  
E. H. PARK.  
MANURE SPREADER.  
APPLICATION FILED NOV. 14, 1904.
2 SHEETS—SHEET 1.
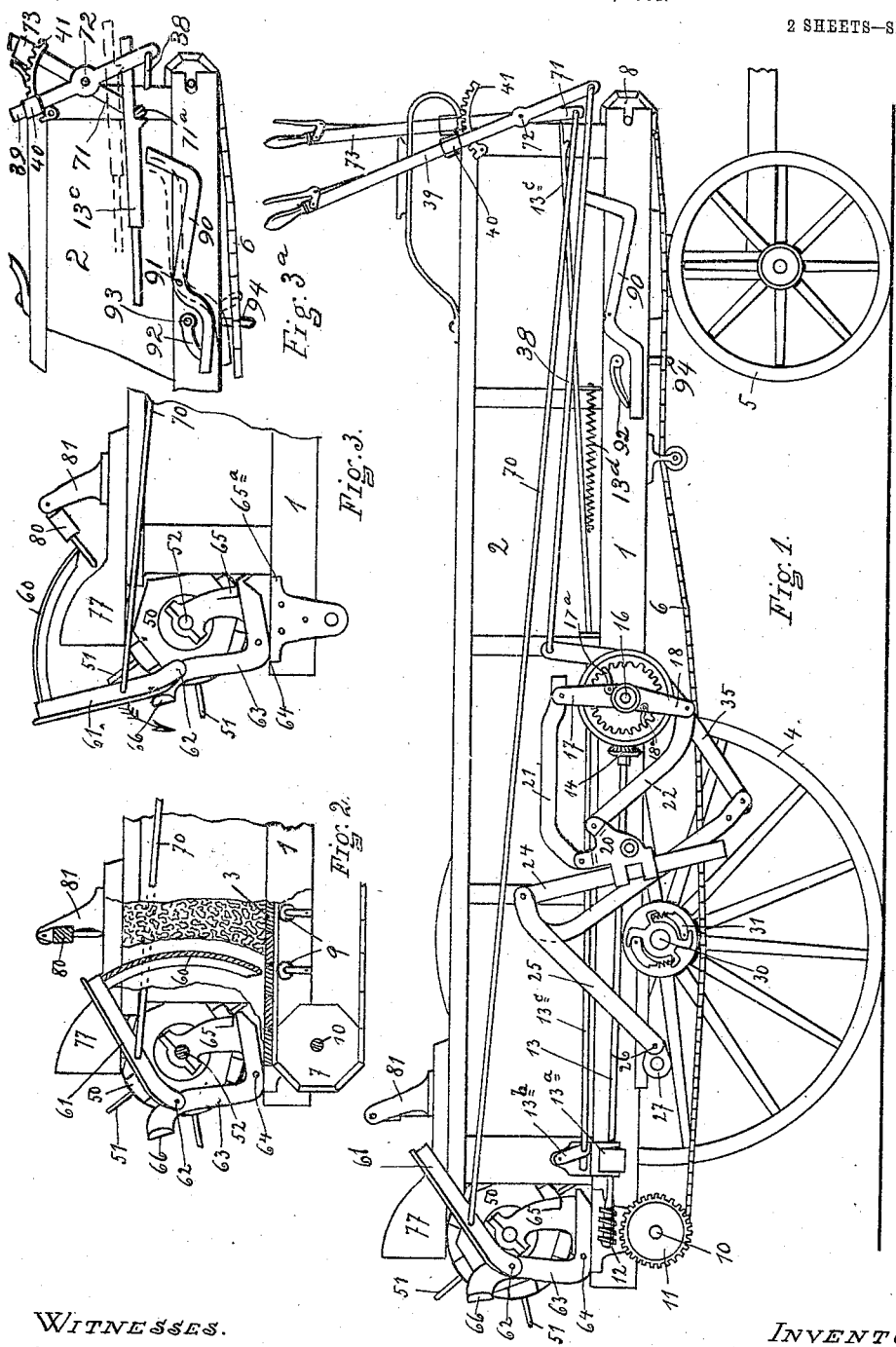
WITNESSES.  
Rich. A. George  
Emma S. Hesse
INVENTOR  
EDWIN H. PARK.  
By Robinson, Martin & Jones  
ATTORNEYS.

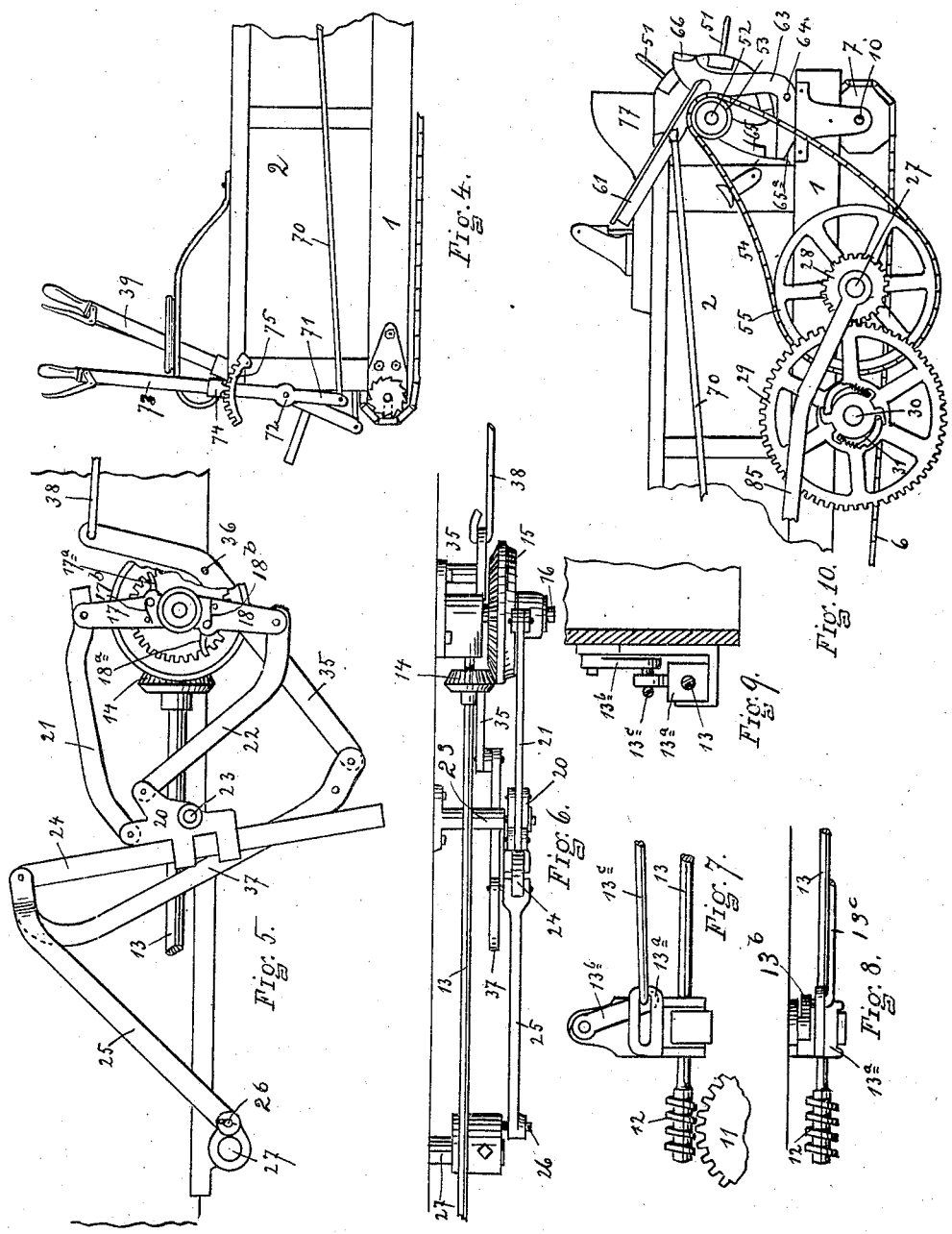

UNITED STATES PATENT OFFICE.

EDWIN H. PARK, OF MILLBURY, MASSACHUSETTS, ASSIGNOR TO STANDARD HARROW COMPANY, OF UTICA, NEW YORK.

MANURE-SPREADER.

No. 842,238.    Specification of Letters Patent.    Patented Jan. 29, 1907.

Application filed November 14, 1904. Serial No. 232,651.

*To all whom it may concern:*

Be it known that I, EDWIN H. PARK, of Millbury, in the county of Worcester and State of Massachusetts, have invented certain new and useful Improvements in Manure-Spreaders; and I do hereby declare that the following is a full, clear, and exact description thereof, which will enable others skilled in the art to which it appertains to make and use the same, reference being had to the accompanying drawings, and to the numerals of reference marked thereon, which form part of this specification.

One of the objects of my present invention is to provide an improved tail-board and operating mechanism for manure-spreaders, and particularly such spreaders as have a rotary beater and a movable bottom to carry the fertilizer to the beater in discharging.

Figure 1 of the drawings shows a side elevation of the machine embodying features of my invention. Fig. 2 shows the rear end of the machine in broken-out section, showing what may be termed the "intermediate" or "second" position of the tail-board and its mountings. Fig. 3 shows in a somewhat similar manner the rear end of the machine with the tail-board in open position. Fig. 3ᴬ shows details at the forward end of the machine particularly appertaining to the mechanism for throwing the movable-bottom feeding mechanism out of gear. Fig. 4 shows a partial side elevation of the machine as seen from the opposite side to that shown in Fig. 1. Fig. 5 shows, on an enlarged scale, details of parts of the feeding mechanism. Fig. 6 shows a plan view of the same. Figs. 7, 8, and 9 show details of other parts of the feeding mechanism. Fig. 10 shows the rear end of the machine as seen from the left.

Referring to the reference-figures in a more particular description of the device, 1 indicates the sills of the frame, which, together with the side boards 2 and the movable bottom of slats 3, constitute the load-holding box of the machine. The box is supported or carried by the rear wheels 4, which also serve to drive the mechanism when spreading or discharging the load, and by the forward wheels 5. The bottom 3 consists of slats, as common and as more particularly shown in Fig. 2, which are secured to a continuous chain 6, passing around wheels or rollers 7 on the rear end of the machine and the wheels or rollers 8 on the forward end of the machine. The bottom 3 may be supported intermediate of its length by rollers, as 9, arranged on the inner side of the sills 1 on the frame. The wheels or rollers 7, which carry the rear end of the movable bottom, are secured on the shaft 10, having bearings on the frame and extending transversely of the rear end of the frame. At one end the shaft 10 carries the toothed worm-wheel 11, which is adapted to be engaged by the worm 12, provided on the rear end of the feeding-shaft 13. The forward end of the feeding-shaft 13 is provided with a bevel-gear pinion 14, which meshes with teeth on the farther side of the combination ratchet and gear wheel 15, mounted on a fixed pivot 16 on the frame. On the pivot 16 there is also mounted the two ratchet-levers 17 and 18, having pawls 17ᵃ and 18ᵃ, respectively, adapted to engage with the internal ratchet-teeth of the combination ratchet and gear wheel 15. There are provided springs 17ᵇ 18ᵇ, as shown, for holding these pawls 17ᵃ and 18ᵃ in engagement with the ratchet-teeth, while permitting the same to be retracted over the teeth.

The swinging ends of the ratchet-levers 17 and 18 are connected, respectively, with the rocker 20 by means of the connecting-rods 21 and 22. The rocker 20 is mounted on a fixed pivot 23 on the frame and provided with an adjustable arm 24, sliding freely through an eye or opening on the rocker 20. The end of the arm 24 is connected by a connecting-rod 25 with the driving-crank 26, provided on one end of the shaft 27. The shaft 27 is provided at the left-hand side of the machine with a gear-pinion 28, which meshes with a gear-wheel 29, provided on the axle-shaft 30 of the rear wheels 4.

It may be noted that the axle-shaft 30 is preferably coupled to the hubs of the wheels 4 by means of an ordinary ratchet connection 31, which serves to turn the shaft when the machine is moved forwardly, but allows the wheel an independent movement, as when turning the machine around. For adjusting the position of the arms 24 with reference to the rocker 20 there is provided a lever 35, mounted on a fixed pivot 36 on a frame and connected at one end, by a connecting-rod 37, with the pivot or joint between the parts 24 and 25 and at the other end connected by a rod 38 with an adjusting-lever handle 39, provided on the front end of the machine, convenient to the operator. This lever is loosely pivoted on shaft 72 and is provided with a catch 40, adapted to engage with a fixed rack 41, whereby the lever and its attached parts may be secured in any desired position of adjustment.

At the rear end of the machine there is provided in the usual manner a rotary beater 50, provided with pins or teeth 51 and mounted on a shaft 52, supported in suitable fixed bearings at the rear of the machine. The beater is arranged to be rotated in what might be termed an "overshot" direction—that is to say, in the direction indicated by the arrow in Fig. 3. For driving the beater there is provided on the end of the shaft 52 a sprocket-wheel 53, which is connected by a sprocket-chain 54 with the sprocket-wheel 55, secured on the shaft 27, before mentioned.

For holding the load against escaping to the rear or becoming engaged with the beater in such manner as to practically prevent the beater from getting started when it is desired to throw the beater into operation there is provided a tail-board 60. This tail-board is preferably made curved or of a circular form, so as to present a convex side to the load and a concave side toward the beater, and is mounted on a swinging frame having arms 61, pivoted at 62 to the bell-crank-lever hangers 63, which lever-hangers are pivoted on fixed pivots to the frame at 64. The arm of the bell-crank hangers 63, to which the beater-arms are not pivoted, extends forwardly in a substantially horizontal direction and has a limited movement between the stop 65, on the one side, and the shoulder 65ª on the other side, as quite clearly appears from Figs. 1 and 3 of the drawings. The hangers 63 also have at their outer ends a shoulder or stop 66, against which the arms 61 are adapted to swing and engage therewith in holding the tail-board in its open position. Connecting with the arm 61 at an intermediate point and extending forwardly on either side of the box there are provided connecting-rods 70. At their forward ends these rods connect with crank-arms 71, provided on a rock-shaft 72, supported in suitable bearings on the front end of the box and adapted to be operated by a lever-handle 73 in convenient position to the operator and on the opposite end of shaft 72 from that on which lever 39 is loosely mounted. The lever-handle 73 is provided with a catch 74, engaging with a holding-rack 75, which holding-rack, however, will preferably be provided with only two securing-notches, one at the limit of movement in each direction.

The curvature of the tail-board 60 is preferably about the same as that of the beater, whereby when the load strikes the beater the machine will spread or distribute the fertilizer to the full capacity at once and not start with a comparatively meager amount and gradually gain as a thicker part of the load comes into engagement with the beater. The curved form also provides a closer-fitting shield over the top of the beater when in open position to prevent the fertilizer being thrown by the beater in an upwardly direction or discharged otherwise than in a shower to the rear of the machine.

In order to prevent fertilizer escaping to the sides and to secure a well-defined marginal line to the strip of fertilizer falling on the ground at the rear of the machine as it is moved forward, there are provided supplementary side pieces or end wall-pieces 77, secured to the frame or box, and which practically closes the ends of the tail-board piece 60 when acting as a shield over the beater. Spanning the rear end of the machine at a position close to the tail-board and beater there is provided a comb 80, pivotally mounted in brackets 81 and free to swing backwardly or forwardly, but particularly into the position shown in Fig. 3 in engagement with the rear edge of the tail-board 60 when in open position, to which position the comb 80 will be moved by coming in contact with the distributing of an overful load. This arrangement serves to cause all of the load to pass under the edge of the tail-board 60, acting as a shield, and the comb also serves to secure a better pulverizing of the fertilizer as it is operated upon by the beater in distributing and discharging it to the rear of the machine.

The rear end of the feeding-shaft 13 is carried in a vertically-movable box 13ª, which is moved vertically to throw the worm 12 into or out of engagement with the worm-wheel 11 by means of the crank 13ᵇ, engaging in a slotted opening in the top of the box, and the connecting-rod 13ᶜ, extending to the forward end of the machine. The forward end of rod 13ᶜ is provided with a tooth adapted to engage with pin 71ª in the crank-arm 71, which is double on that side of the machine, and an extension of the rod 13ᶜ beyond the tooth extends between the two parts of this arm 71. The spring 13ᵈ serves to move the rod 13ᶜ toward the front and throw out the worm 12 when not otherwise held. When the lever 73 is operated to swing the crank-arm 71 to the rear, the tooth engages with the pin 71ª, the spring 13ᵈ is overcome, and the worm 12 thrown into operation. To trip the feeding mechanism and get it out of gear, there is a trip-lever 90 provided, pivoted at 91 and adapted to engage 13ᶜ and force it up to disengage the tooth from 71ª. To operate the trip-lever 90, there is provided a finger 92 on the end of a rock-shaft 93, extending across the frame and having a projection 94, adapted to be engaged by a slat between the chains 6.

Between the gear-pinion 28 and the shaft 27 there is introduced a clutch adapted to be operated by the lever 85, extending to the forward end of the machine, whereby the mechanism may be thrown into and out of gear at this point. The details of the clutch being generally understood are not illustrated.

The general operation of manure-spreaders being so generally understood, a specific description of the mode of operation may be omitted and attention called simply to certain more particular features.

It will be noted that when the adjustable arm 24 of the rocker is moved to a position to shorten the arm with reference to the distance it projects from the pivot 23 of the rocker 20 the rocker will have a greater movement. Hence the ratchet-levers 17 and 18 will be moved farther with each revolution of the crank-shaft 27, whereby the movable bottom will be fed to the rear faster and the load discharge more rapidly and of course distribute more thickly over the ground.

As the arm 24 is extended the movement of the ratchet-levers 17 and 18 is decreased, and of course the movable bottom is moved to the rear less rapidly, resulting in a thinner distribution of the fertilizer over the ground. The lever 39 for controlling this adjustment is readily within the reach of the operator, whereby he can vary the distribution, depending upon the nature of the ground that the machine is being passed over and the nature of the contents of the box which is being distributed.

With reference to the tail-board, when the box is loaded the tail-board will be held in its closed and forward position by a continuous draft on the side connecting-rods 70. When it is desired to discharge the load, the first movement so far as the tail-board mechanism is concerned is a thrust movement on the rods 70, which moves the tail-board 60 rearwardly, while the hangers 63 move from the position shown in Fig. 1 to that shown in Fig. 2. In so doing the tail-board is carried away from the fertilizer in the box, as shown in Fig. 2. The further thrust movement on the rod 70 causes the frame carrying the tail-board to swing on the pivot 62 until it is stopped by coming in contact with the stop-shoulder 66, in which position the tail-board will occupy a position over the beater and will be adapted to operate as a shield, as heretofore pointed out. Of course numerous other mechanisms are provided in connection with the machine—as, for instance, mechanisms to stop the movement of the bottom when the load has been entirely distributed, &c.—which it is not deemed necessary to specifically describe herein.

What I claim as new, and desire to secure by Letters Patent, is—

1. The combination in a manure-spreader of a load-holding box, a tail-board therefor, mountings for the tail-board arranged to provide for an initial movement thereof longitudinally of the box to become freed from the load and then up out of the way of the load, substantially as set forth.

2. The combination in a manure-spreader of a load-holding box, a tail-board therefor, movable hangers by means of which the tail-board is mounted, and means for moving the tail-board first longitudinally of the box to free it from the load, and then up out of the way of the load, substantially as set forth.

3. The combination in a manure-spreader of a load-holding box having a movable bottom, a beater provided at the rear end of the box to distribute the load, a tail-board arranged forward of the beater and adapted to close the rear end of the box and to be moved to a position over the beater to act as a shield, and means for moving the tail-board first longitudinally of the box toward the rear to free it from the load, and then up out of the way of the load in passing to the beater, substantially as set forth.

4. The combination in a manure-spreader of a load-holding box having a movable bottom, a beater arranged at the rear end of the box, a tail-board adapted to close the rear end of the box in advance of the beater and be moved to a position over the beater to act as a shield, and mountings for the tail-board arranged to provide for an initial movement to the rear to become freed from the load, and then up out of the way of the load in its passage to the beater, substantially as set forth.

5. The combination in a manure-spreader of a load-holding box having a movable bottom, and means for feeding the bottom toward the rear, a rotary beater arranged at the rear end of the box with means for driving the same, a tail-board adapted to close the rear end of the box in advance of the beater and mounted to provide for a limited movement longitudinally of the box and up over the rear end of the box, rods extending along the sides of the box and connected with the tail-board, a rock-shaft at the forward end of the box having crank-arms to which the said rods are attached respectively, means for holding said crank-arms secured with the tail-board in closed forward position, and manually-operatable means for moving the tail-board through the medium of said rock-shaft and connecting-rods, substantially as set forth.

In witness whereof I have affixed my signature, in presence of two witnesses, this 5th day of November, 1904.

EDWIN H. PARK.

Witnesses:
LYDIA M. LOVELL,
Mrs. N. H. PARK.